United States Patent
Schoeneberg et al.

(10) Patent No.: US 8,297,247 B2
(45) Date of Patent: Oct. 30, 2012

(54) VALVE DRIVE FOR GAS EXCHANGE VALVES OF AN INTERNAL COMBUSTION ENGINE, COMPRISING AN AXIALLY MOVABLE BEARING

(75) Inventors: Dirk Schoeneberg, Raitenbuch (DE); Holger Voges, Tiefenbach (DE); Joerg Wutzler, Zwickau (DE)

(73) Assignee: Audi AG, Ingolstadt (DE)

( * ) Notice: Subject to any disclaimer, the term of this patent is extended or adjusted under 35 U.S.C. 154(b) by 286 days.

(21) Appl. No.: 12/529,213

(22) PCT Filed: Feb. 28, 2008

(86) PCT No.: PCT/EP2008/001564
§ 371 (c)(1),
(2), (4) Date: Mar. 8, 2010

(87) PCT Pub. No.: WO2008/107106
PCT Pub. Date: Sep. 12, 2008

(65) Prior Publication Data
US 2010/0175652 A1    Jul. 15, 2010

(30) Foreign Application Priority Data
Mar. 2, 2007   (DE) .......................... 10 2007 010 148

(51) Int. Cl.
*F01L 1/34* (2006.01)
(52) U.S. Cl. ................................. 123/90.18; 123/90.6
(58) Field of Classification Search .......... 123/90.1, 123/90.15–90.18, 90.6, 90.21
See application file for complete search history.

(56) References Cited

U.S. PATENT DOCUMENTS

| | | | | |
|---|---|---|---|---|
| 3,633,554 A | * | 1/1972 | Nakajima et al. | 123/90.18 |
| 3,730,150 A | * | 5/1973 | Codner, Jr. | 123/90.18 |
| 5,129,407 A | * | 7/1992 | Phillips | 123/90.18 |
| 5,218,883 A | | 6/1993 | Swars | |
| 5,289,806 A | * | 3/1994 | Hurr | 123/90.17 |
| 7,311,447 B2 | * | 12/2007 | Takeo et al. | 384/457 |
| 7,341,032 B1 | * | 3/2008 | Del Santo | 123/90.18 |
| 7,404,383 B2 | * | 7/2008 | Elendt | 123/90.16 |
| 7,409,938 B2 | * | 8/2008 | Dengler | 123/90.18 |

FOREIGN PATENT DOCUMENTS

| | | |
|---|---|---|
| DE | 1 19519048 | 11/1996 |
| DE | 10148243 | 4/2003 |
| DE | 10241920 | 3/2004 |
| DE | 102004011586 | 10/2004 |
| DE | 202004011586 | 12/2004 |
| DE | 102004021376 | 12/2005 |
| EP | 0328010 | 8/1989 |
| WO | WO 2008012306 | 1/2008 |

* cited by examiner

*Primary Examiner* — Thomas Denion
*Assistant Examiner* — Daniel Bernstein
(74) *Attorney, Agent, or Firm* — Novak Druce + Quigg LLP

(57) ABSTRACT

A valve drive assembly for selectively actuating a pair of valves of an internal combustion engine generally consisting of a pairs of cam supports rotatably fixed an axially displaceable on a camshaft, each provided with at least two cam profiles; means rotatably fixed and axially displaceable relative to the cam shaft, interposed between the cam supports; and means for selectively axially displacing the cam supports and the interposed means as a unit.

8 Claims, 3 Drawing Sheets

VALVE DRIVE FOR GAS EXCHANGE VALVES OF AN INTERNAL COMBUSTION ENGINE, COMPRISING AN AXIALLY MOVABLE BEARING The invention relates to a valve drive for gas exchange valves of an internal combustion engine and an internal combustion engine with such a valve drive.

BACKGROUND OF THE INVENTION

To improve the thermodynamic properties of internal combustion engines, mechanical devices that influence the working cycle of the valve drive and make it possible, for example, to vary, as a function of speed, the opening times or the stroke of the gas exchange valves of cylinders of the internal combustion engine are known.

A valve drive of the initially mentioned type, in which a cam support is arranged in a rotationally fixed and axially movable manner on a basic camshaft, is already known from DE 10 2004 011 586 A1. To actuate two gas exchange valves of a cylinder of the internal combustion engine, two axially offset cam groups, each of which has two cams with different cam profiles, are provided on the cam support. By axial shifting of the cam support on the basic camshaft between two shift positions, in each case one of the two cams of each cam group can be brought into mechanical contact with a cam follower of one of the gas exchange valves, as a result of which the stroke and/or the opening times of the gas exchange valve can be adjusted. The axial shift of the cam support on the camshaft is carried out using two worm drives, which are arranged at an axial distance from one another in the cylinder head housing of the internal combustion engine, whereby each worm drive has a final control element in the form of an actuator and an engagement element in the form of a driving pin, whereby the latter can be caused to engage by actuating the final control element with a curved link on the cam support. In one of the two worm drives, the curved link has a left-twist helical groove and in the other of the two worm drives, it has a right-twist helical groove, so that the cam support is shifted right or left, depending on whether the adjusting element of one or the other worm drive is actuated. The cam support can be rotated and axially shifted in a stationary bearing between the two cam profile groups. EP 1 608 849 B1 also discloses such a valve drive.

To improve the influence of the working cycle of the valve drive, it would be desirable to expand the cam groups by another cam with another cam contour or another cam profile. Such an expansion of the cam groups by another cam or another cam profile necessitates, however, to move the cam support back and forth between three different shift positions in which in each case, another cam or another cam profile works together with the cam follower. As a result, the movement path of the cam support is longer, which, in view of the relatively small axial distance between two adjacent gas exchange valves of a cylinder especially in the case of a mounting of the cam support between the valves, can lead to problems in the axial dimensioning of the bearing.

Based on this, the object of the invention is to improve a valve drive of the initially mentioned type to the extent that the movement path of the cam support can be readily increased with respect to the axial dimensioning of the bearing, in particular when the latter is arranged between the valves.

SUMMARY OF THE INVENTION

This object is achieved according to the invention in that the bearing can be shifted in the axial direction of the camshaft relative to the housing of the internal combustion engine.

Based on its axial movability, the bearing can be moved in a shift of the cam support in the same direction as the cam support, which it makes possible despite the relatively small axial distance between two adjacent gas exchange valves of a cylinder that a bearing arranged between the gas exchange valves has a large bearing width that supports load. As a result, the bearing, if necessary, can be designed as a conventional plain bearing or else also as a roller bearing.

The axial shift of the bearing is carried out together with the axial shift of the cam support, and therefore the bearing according to an advantageous configuration of the invention is inserted into a recess between two opposing boundary areas of the cam support, whose distance corresponds to the width of the bearing and which, when shifting the cam support, act on the opposing faces of the bearing to move the bearing together with the cam support. The shift of the cam support is carried out analogously to the prior art by means of a worm drive, which is arranged at an axial distance from the bearing.

A preferred configuration of the invention provides that the cam support comprises at least one cam group or cam profile group with two or more different cam profiles and the bearing can be stopped at discrete shift positions, the distance between which corresponds to the center distance between the two or more cam profiles. Each cam group or cam profile group of the cam support preferably comprises three different cam profiles, while the bearing can be stopped in three shift positions, whose distance to the respective center distance corresponds to three cam profiles.

The stopping of the cam support is preferably carried out by a stopping device that acts on the bearing from the outside, mounted permanently in the housing of the internal combustion engine. In this way, the stopping device can be installed and fabricated considerably easier than a stopping device that is arranged inside the camshaft, as in the valve drive in the initially mentioned DE 10 2004 011 586 A1, and that acts on the cam support from the inside. In addition, the tolerance problems can be eliminated.

To take into account different thermal expansions of the camshaft or of the cylinder head housing that is equipped with the stopping device, the cam support is clamped, using the stopping device, in its opposing outer shift positions preferably against a stop of the cylinder head housing.

Another advantageous configuration of the invention provides that the cam support comprises two cam groups or cam profile groups that are arranged at a distance and that the bearing is arranged between the two cam groups or cam profile groups and adjoins the latter, whereby at least during the shift of the cam support, it rests with one of its two opposing faces against an axial boundary area of one of the two cam groups or cam profile groups.

To minimize the sliding friction between the face of the bearing and the adjacent axial boundary area of the adjoining cam group or cam profile group, the two opposing faces of the bearing suitably have an outside diameter that is smaller than a base circle diameter of the cam and/or cam profile of the cam groups or cam profile groups.

If the bearing is designed in a conventional way as a plain bearing, it preferably comprises a bearing bush that is mounted rotationally fixed inside the cylinder head housing of the internal combustion engine, whereby the bearing bush can be moved relative to the cylinder head housing in the axial direction of the camshaft and has an inner peripheral surface that is coaxial with the axis of rotation of the camshaft, and said inner peripheral surface slides on the adjacent outer peripheral surface of a cylindrical section of the cam support. In contrast, its outer peripheral surface is not rotationally symmetrical or coaxial with the axis of rotation of the camshaft and occupies a complementary guide recess in at least one cylinder head bearing bridge that holds the bearing bush positively locked.

To lubricate the plain bearing, the bearing bush in this case advantageously has several lubricating channels that occupy the wall of the bearing bush and that end in the inner and outer peripheral surface of the bearing bush, so that the peripheral surfaces of the bearing and cam support that slide on one another can be charged with pressurized motor oil from a lubricant supply channel advantageously recessed in the cylinder head bearing bridge through the bearing bush. To ensure that the lubricant supply channel in the bearing bridge communicates with their inner peripheral surface notwithstanding the shift position of the cam support and the bearing bush, the bearing bush preferably has a number of lubricant channels that correspond to the number of cams of each cam group or cam profile group, channels whose discharge points on the outer peripheral surface of the bearing bush are arranged at an axial distance that corresponds to the center distance of the cam or cam profile of the cam or cam profile group.

DETAILED DESCRIPTION OF THE PREFERRED EMBODIMENTS OF THE INVENTION

Figure 1:
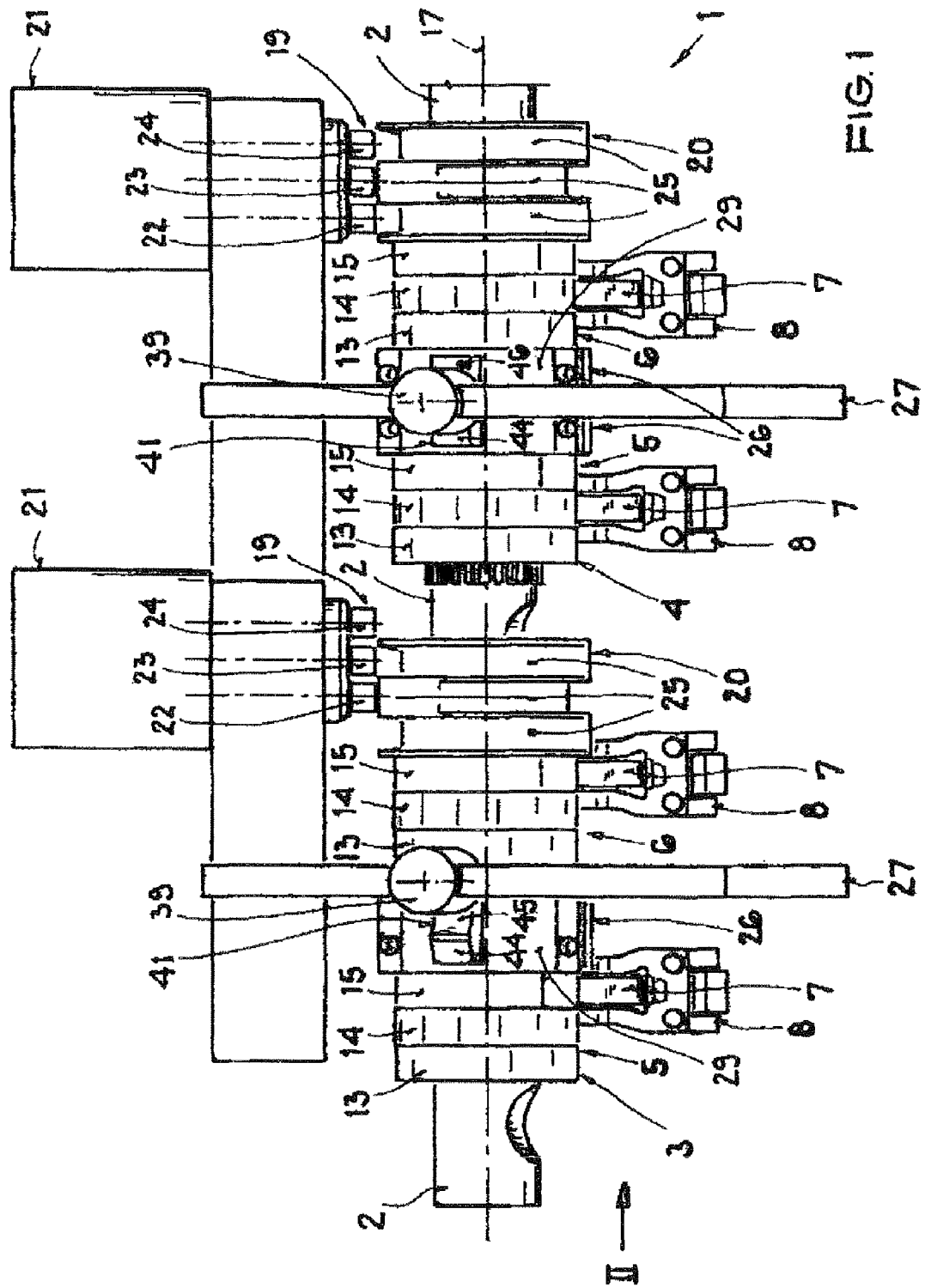
FIG. 1: shows a top view from above on a valve drive for a plurality of intake valves of cylinders of an internal combustion engine, which comprises two cam supports that can move on a camshaft.

With the valve drive 1, only partially shown in the drawing, for four intake valves (not shown) of cylinders of an internal combustion engine with an overhead camshaft 2 that is mounted to rotate in a cylinder head housing of the internal combustion engine, the stroke and the opening times of the two intake valves of each cylinder that are actuated by the camshaft 2 can be adjusted.

Figure 2:
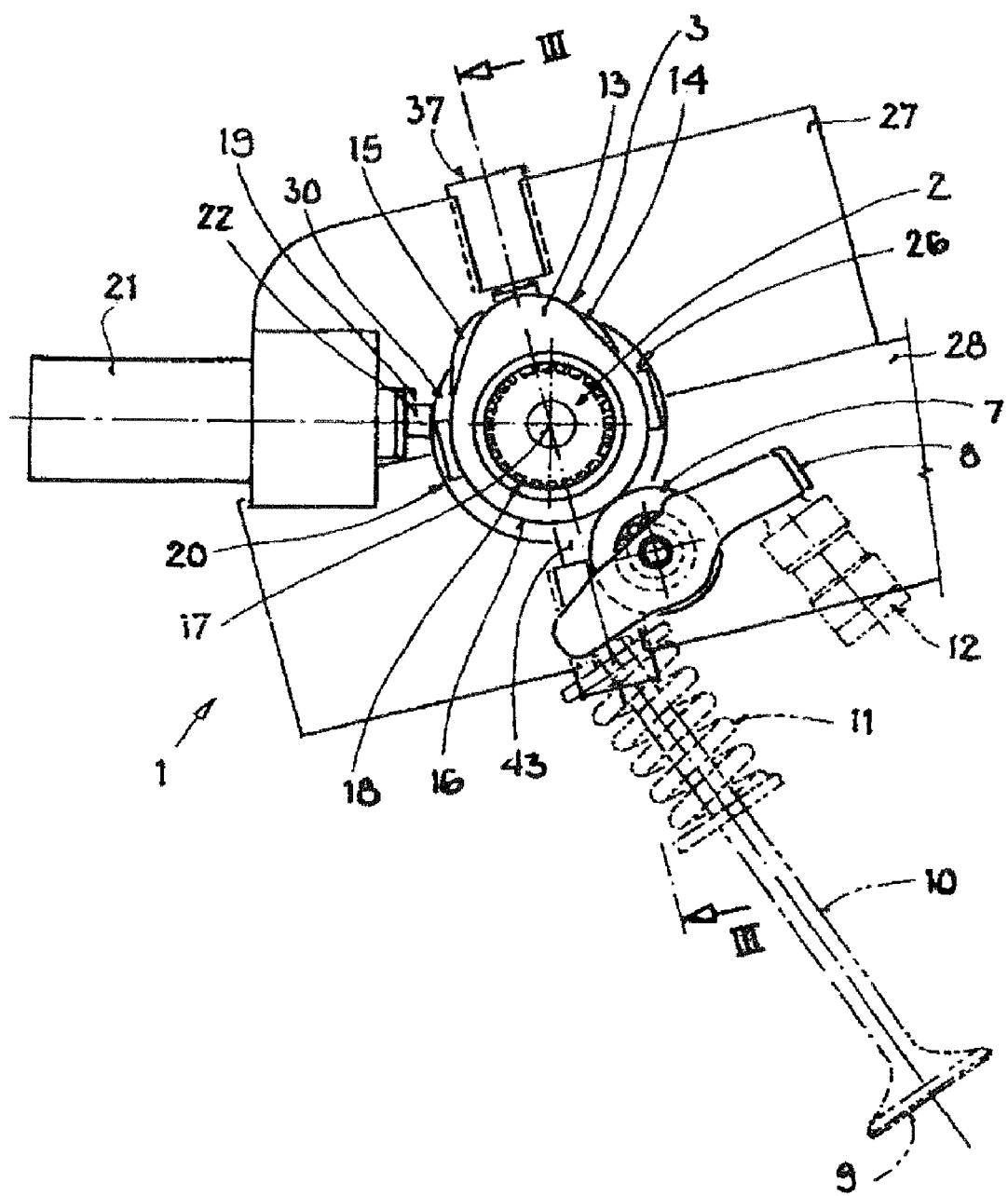
FIG. 2: shows a front side view of the valve drive in the direction of arrows II-II in FIG. 1.
Figure 3:
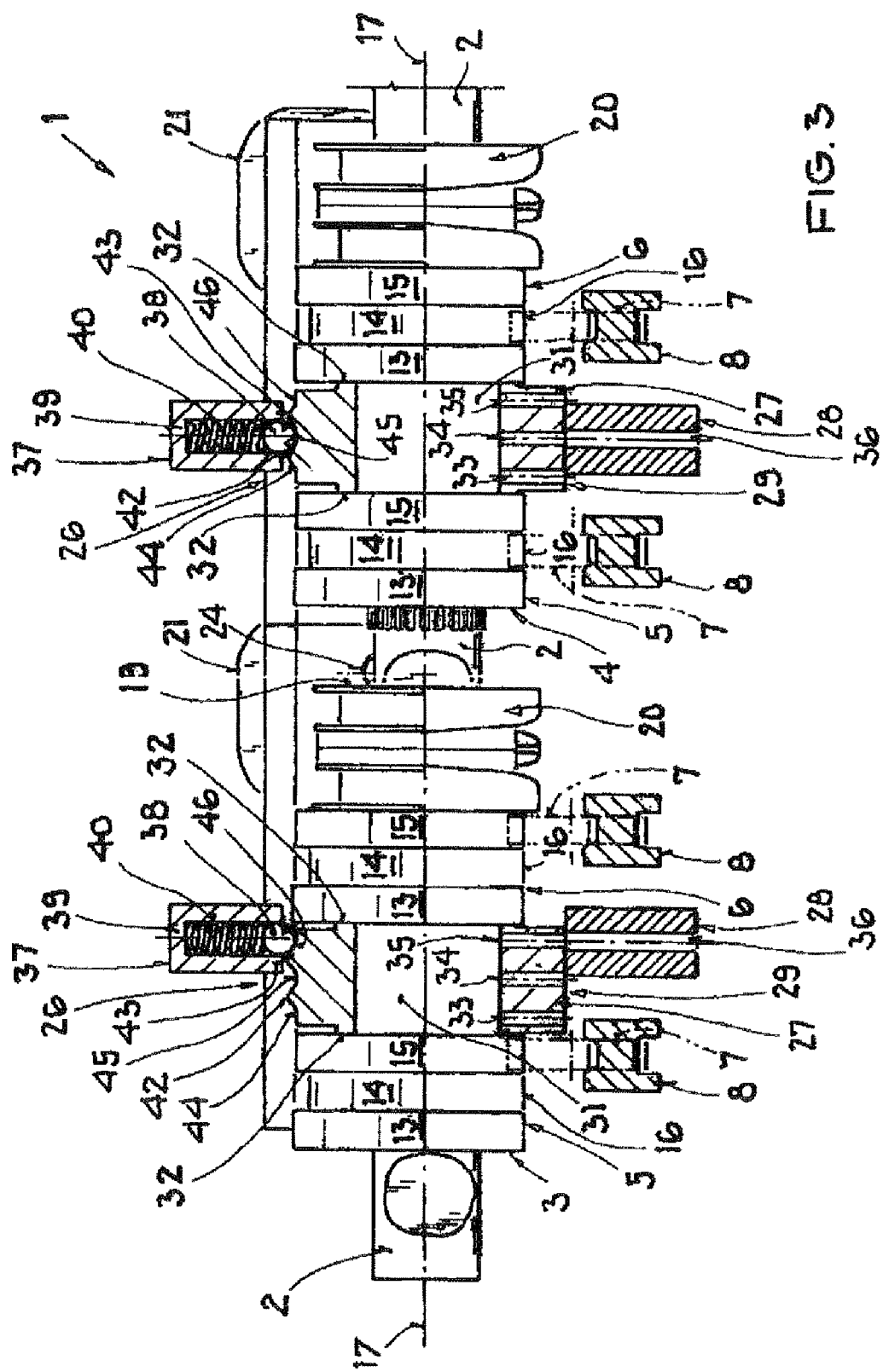
FIG. 3: shows a longitudinal section view of the valve drive along the line III-III of FIG. 2.

As best shown in FIGS. 1 and 3, the valve drive 1 in this respect for each pair of intake valves comprises a rotationally fixed and axially movable cam support 3 or 4 that is mounted on the camshaft 2, whereby each cam support 3, 4 has two cam groups 5, 6 that are arranged at an axial distance from one another. Each of the two cam groups 5, 6 works together with a roller 7 of a pivoting roller cam follower 8 of one of the valves. Via the roller 7, a valve link 10 that is provided on the lower end with a valve disk 9, shown in FIG. 2 in dashed lines, is actuated, and said valve link can be pressed downward against the force of a valve spring 11 in the cylinder head to open the respective valve. For each of the valves, moreover, the valve drive 1 comprises a hydraulic valve play equalization element 12 that is also shown in FIG. 2 in dashed lines.

Each of the two cam groups 5, 6 of each cam support 3, 4 has three cams 13, 14, and 15, which have different cam contours or cam profiles and can be brought into mechanical contact selectively with the roller 7 of the cam follower 8 of the associated valve by axial movement of the associated cam support 3, 4 on the camshaft 2. This is shown by way of example in FIG. 1, where in a first outside shift position of the left cam support 3, the rollers 7 of the cam follower 8 of the two left valves rest against the right outside cam 15 of the two cam groups 5 and 6, while the rollers 7 of the can follower 8 of the two right valves in a second center shift position of the right cam support 4 rest against the center cam 14 of the two earn groups 5 and 6.

As best shown in FIG. 2, the two cam groups 5, 6 in each case have a base circle section 16 on the side of the cam support 3, 4 that points downward in FIG. 2, opposite to the cams 13, 14, 15, and the outside diameter of said base circle section 16 is the same over the entire axial length of the cam groups 5, 6 and extends over an inscribed angle of about 180 degrees. The cams 13, 14, 15 of each cam group 5, 6 have different contours or profiles, whereas the crowns of the contours of the respective left and the respective right outside cams 13 and 15 are approximately equidistant from the axis of rotation 17 of the camshaft 2 (FIG. 1); they are, however, offset from one another in the peripheral direction (FIG. 2), while the crown of the contour of the respective center cam 14 is closer to the axis of rotation 17 of the camshaft 2 and in addition is offset in the peripheral direction from the crown of the contours of the cams 13, 15 (FIG. 2). The distances of the crowns of the cam contours are matched to the heights of stroke of the valve links 10 so that the intake valves are completely opened when the right cams 15 are arranged above the rollers 7 of the associated cam follower 8 in the first outside shift position shown in FIGS. 1 and 3 in the example of the left cam support 3 and work together with the latter, while the intake valves are only partially opened, when the center cams 14 work together with the rollers 7 of the associated cam follower 8 in the second center shift position shown in FIGS. 1 and 3 in the example of the right cam support 4. When, in a third outside shift position of the cam supports 3, 4, the cams 13 work together with the rollers 7 of the associated cam follower 8, the intake valves are also completely opened, but with other opening times in comparison to the first shift position. The sequence of the three cams 12, 13, 14 is the same in all cam groups 5, 6 on the cam supports 3, 4, but the contours of the cams 12, 13, 14 of different cam groups 5, 6 can be formed and/or dimensioned differently.

To connect the cam supports 3, 4 rotationally fixed to the camshaft 2, but to make possible their axial movement along the camshaft 2, the hollow-cylindrical cam supports 3, 4 on their inner peripheries have a longitudinal gearing that combs with a complementary outside gearing against the camshaft 2, as shown in FIG. 2 at 18.

The axial movement of the cam support 3, 4 on the camshaft 2 to adjust the stroke or the opening times of the intake valves is carried out when necessary and is always performed when the base circle section 16 of the cam groups 5, 6 faces the rollers 7 of the cam follower 8 during an angle of rotation of the camshaft 2 by about 180 degrees. The measurement of the axial Movement of the cam support 3, 4 between two adjacent shift positions corresponds to the center distance of adjacent cams 13, 14 or 14, 15 or cam profiles.

So that the cam supports 3, 4 can be moved when necessary in any of the three shift positions, a worm drive 19 is provided for each cam support 3, 4. Each of the worm drives 19 comprises a curved link 20 on the right front end of the associated cam support 3 or 4, as well as a final control element 21 (actuator) that is mounted in a stationary manner in the cylinder head housing with three engagement elements, arranged at axial distance, in the form of carrier pins 22, 23, 24, of which in each case one can extend from the final control element 21 and can be engaged with its free end with a groove 25 of the curved link 20 to move the cam supports 3, 4 in each case to the left or right by the center distance between two adjacent cams 13, 14 or 14, 15.

The design and the mode of operation of the worm drive 19 is described in detail in a co-dependent patent application of the applicant corresponding to PCT Application No. PCT/EP2008/001576, which is incorporated herein by reference.

The axial movement path of the cam supports 3, 4 in the two outside shift positions, i.e., in the first and in the third shift positions, is in each case limited by a stop (not shown) of the cylinder head housing.

To center the cam supports 3, 4 relative to the axis of rotation 17 of the camshaft 2, or to keep it centered during its movement relative to the axis of rotation 17, the cam supports 3 and 4 in each case are mounted to rotate between two valves by means of a plain bearing 26, as best shown in FIGS. 1 and 3. Each of the two bearings 26 is held by two cylinder head bearing bridges 27, 28, arranged over one another, oriented crosswise to the axis of rotation 17 of the camshaft 2, stationary relative to the cylinder head housing, from which one 27 of said cylinder head bearing bridges 27, 28 is arranged above the camshaft 2 and the other 28 is arranged below the camshaft 2.

In contrast to the known bearings, mounted in a stationary way in the cylinder head housing, of camshafts or cam supports, the two plain bearings 26 are movable relative to the cylinder head bearing bridges 27, 28 in the axial direction of the camshaft 2, so that they are moved axially in each case together with the associated cam supports 3, 4, if the latter is moved into another shift position when necessary.

For this purpose, the two plain bearings 26 in each case comprise a bearing bush 29, which is mounted between the two cam groups 5, 6 of each cam support 3, 4 in a rotatable manner to the latter and can be moved into an axial guide recess 30 of the two associated cylinder head bearing bridges 27, 28. The guide recess 30 has a non-circular opening cross-section, while the bearing bush 29 has a complementary, non-circular outside cross-section to prevent, on the one hand, the bearing bush 29 from rotating with the cam support 3, 4 and, on the other hand, the bearing bush 29 from running in its axial movement with positive locking. However, the bearing bush 29 has a circular inside cross-section that is coaxial with the axis of rotation 17 of the camshaft 2, whose diameter is matched to the outside diameter of a cylindrical section 31 of the cam support 3, 4 that occupies the plain bearing 26, so that the cylindrical inner peripheral surface of the bearing bush 29 slides on the opposing outer peripheral surface of the cam support section 31. In this case, the diameter of the cam support section 31 is smaller than the diameter of the base circle section 16 of the cam groups 5, 6, as shown in FIG. 3.

For fastening to the cylindrical cam support section 31 of the associated cam support 3, 4 that is limited on both sides by axial boundary areas of the cam groups 5 or 6, the bearing bush 29 consists of two half-shells, which are connected to one another in a plane that occupies the axis of rotation 17 of the camshaft 2. The axial length of the bearing bush 29 is slightly shorter than the distance between the opposing axial boundary areas of the two cam groups 5 or 6 of each cam support 3, 4, so that the cam supports 3, 4 can rotate with little axial play relative to the bearing bush 29. To minimize the friction between the face and the opposing boundary area, in the case of a contact between the opposing faces of the bearing bush 29 and the respectively adjacent boundary areas of the cam groups 5 or 6, for example during a movement of the cam support 3, 4 on the camshaft 2, the bearing bush 29 has two offset front ends 32 (FIG. 3), whose outside diameters are smaller than the outside cross-section dimensions of the remainder of the bearing bush 29. Further, the axial length of the bearing bush 29 is selected so that in the two outside shift positions it does axially overlap the adjacent cam follower 8, but not, however, its roller 7.

On its lower side, the bearing bush 29 has three radial lubricant channels 33, 34, 35, which extend from an outer peripheral surface of the bearing bush 29 through the wall thereof up to the inner peripheral surface, which is in sliding contact with the peripheral surface of the cam support section 31. The lubricant channels 33, 34, 35 are arranged at an axial distance, which corresponds to the center distance of adjacent cams 13, 14, 15 or cam profiles, so that in each of the three shift positions of the cam supports 3, 4 and the bearing bush 29, one of the lubricant channels 33, 34, 35 communicates with a lubricant supply channel 36 in the lower cylinder head bearing bridge 28. Pressurized motor oil in the respectively aligned lubricant channel 33, 34 or 35 is fed through the channel 36, as shown by way of example in FIG. 3 for the right or center lubricant channel 35 or 34.

To hold the cam support 3, 4 with the bearing bush 29 in the desired shift position, the bearing bush 29 can be stopped axially by means of a stopping device 37 in each of the shift positions. As best shown in FIG. 3, the stopping device 37 comprises a stationary locking agent, mounted in the cylinder head bearing bridge 27 above the cam support 3, 4, in the form of a locking ball 38 that is elastically prestressed by a helical compression spring 40 in a spring bushing 39, whereby in each of the three shift positions of the cam support 3, 4, said locking ball can be brought into locking engagement with an axial locking strip 41 that is mounted on the top of the bearing bush 29 (FIG. 1); said locking strip has three locking notches 44, 45, 46 that correspond to the shift positions and are separated by projections 42, 43.

The design and the mode of operation of the stopping device 37 is described in detail in a co-dependent patent application of the applicant with the internal reference P6500 and the same date of application, to whose disclosure reference is made here.

The invention claimed is:

1. An assembly for selectively actuating a pair of valves of an internal combustion engine, comprising:
   a cam supporter rotatably fixed and axially displaceable on a camshaft of said engine, provided with a spaced set of cam surfaces each provided with three cam profiles;
   a bearing mounted on a portion of said cam supporter between said spaced set of cam surfaces thereof;
   means for selectively axially displacing said cam supporter; and
   means cooperatively intergaging said bearing and a portion of said engine for releasably retaining said cam supporter in a selected axial position on said camshaft.

2. An assembly according to claim 1 wherein said bearing comprises a bushing.

3. An assembly according to claim 2 wherein said bushing includes a pair of semi-cylindrical segments including means for securing said segments together when mounted on said cam supporter.

4. An assembly according to claim 1 wherein said bearing includes annular recessed surfaces, facing surfaces of adjacent cam supporter portions.

5. An assembly according to claim 1 wherein said bearing comprises a roller bearing.

6. An assembly according to claim 1 wherein each of said means for selectively displacing said cam supporter axially includes at least one worm device.

7. An assembly according to claim 1 wherein said means cooperatively interengaging said bearing and a portion of said engine for releasably retaining said cam supporter in a selected axial position on said camshaft comprises a set of axially spaced, annular recesses disposed on a cylindrical surface of said bearing, a retainer ball receivable in said recesses and means disposed between a portion of said engine and said ball, biasing said ball toward said bearing and into an aligned one of said recesses, upon axial displacement of said earn supporter.

8. An assembly according to claim 1 wherein a portion of said cam supporter includes at least one passageway for supplying a lubricant to said bearing.

* * * * *